United States Patent [19]
Takeda

[11] Patent Number: 5,978,027
[45] Date of Patent: Nov. 2, 1999

[54] IMAGE PICKUP APPARATUS HAVING SHARPNESS CONTROL

[75] Inventor: Nobuhiro Takeda, Kawasaki, Japan

[73] Assignee: Canon Kabushiki Kaisha, Tokyo, Japan

[21] Appl. No.: 08/901,287

[22] Filed: Jul. 29, 1997

Related U.S. Application Data

[63] Continuation of application No. 08/481,827, Jun. 7, 1995, abandoned, which is a continuation of application No. 08/073,499, Jun. 9, 1993, abandoned.

[30] Foreign Application Priority Data

Jun. 24, 1992 [JP] Japan ..................... 4-166411

[51] Int. Cl.⁶ ............ H04N 5/335; H04N 5/232; H04N 5/238
[52] U.S. Cl. ............ 348/348; 348/296; 348/351; 348/364; 396/123
[58] Field of Search .................... 348/207, 222, 348/224, 228, 229, 230, 294, 296, 297, 298, 345, 348, 349, 350, 351, 353, 354, 362, 363, 364, 365; 396/96, 121, 123, 213, 233, 234; H04N 5/232, 5/235, 5/238

[56] References Cited

U.S. PATENT DOCUMENTS

| | | | |
|---|---|---|---|
| 4,804,831 | 2/1989 | Baba et al. | 250/201 |
| 4,969,045 | 11/1990 | Haruki et al. | 358/228 |
| 5,036,400 | 7/1991 | Haruki | 348/364 |
| 5,049,997 | 9/1991 | Arai | 348/364 |
| 5,051,833 | 9/1991 | Tsuji | 358/227 |
| 5,093,716 | 3/1992 | Kondo et al. | 358/41 |
| 5,128,768 | 7/1992 | Suda et al. | 348/227 |
| 5,272,538 | 12/1993 | Homma et al. | |
| 5,280,359 | 1/1994 | Mimura et al. | 348/230 |
| 5,339,163 | 8/1994 | Homma et al. | 348/229 |
| 5,343,246 | 8/1994 | Arai et al. | 348/363 |
| 5,349,382 | 9/1994 | Tamura | 348/345 |
| 5,353,058 | 10/1994 | Takei | 348/363 |
| 5,363,137 | 11/1994 | Suga | 348/302 |
| 5,416,518 | 5/1995 | Lee et al. | 348/349 |
| 5,473,374 | 12/1995 | Shimizu | 348/363 |
| 5,512,951 | 4/1996 | Torii | 348/353 |
| 5,565,917 | 10/1996 | Takeda | 348/354 |
| 5,589,880 | 12/1996 | TsuKui | 348/229 |

Primary Examiner—Wendy Garber
Assistant Examiner—Ngoc-Yen Vu
Attorney, Agent, or Firm—Fitzpatrick, Cella, Harper & Scinto

[57] ABSTRACT

An image pickup apparatus has an AF function which determines a focus state of an object using an image signal obtained from a signal output of an image pickup device and detects the lens position in an in-focus state. The apparatus includes an image-region setting circuit for selectively extracting an image region for detecting the lens position in an in-focus state, an optimum-exposure-amount calculation circuit for calculating an optimum amount of exposure for the image region using an image signal within the image region set by the image-region setting circuit, and a focus detection circuit for calculating the lens position in an in-focus state using an image signal within the image region exposed with the optimum amount of exposure calculated by the optimum-exposure-amount calculation circuit.

11 Claims, 10 Drawing Sheets

(PRIOR ART)
FIG. 4(a) IMAGE SIGNAL
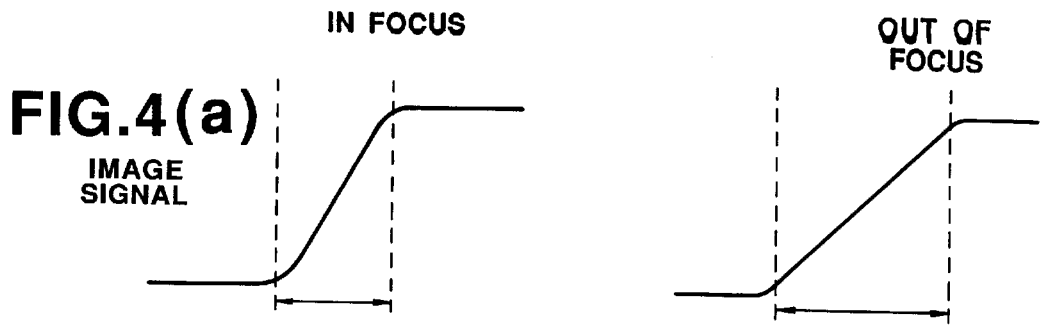
FIG. 4(b) DIFFERENTIATED WAVEFORM
FIG. 4(c) DL1
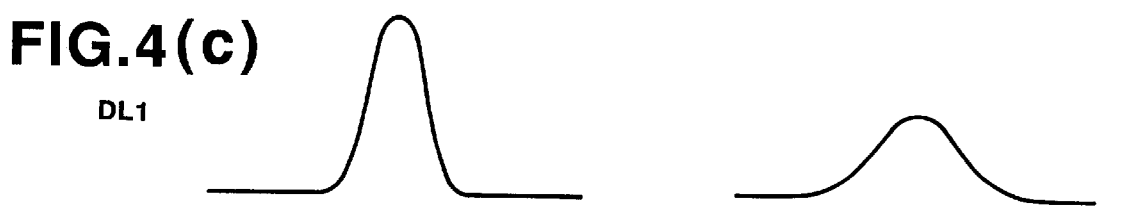
FIG. 4(d) DL2
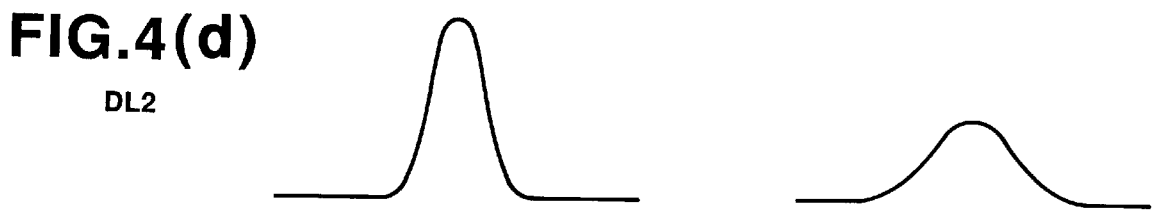
FIG. 4(e) INTEGRATED WAVEFORM $I = D + DL1 + DL2$
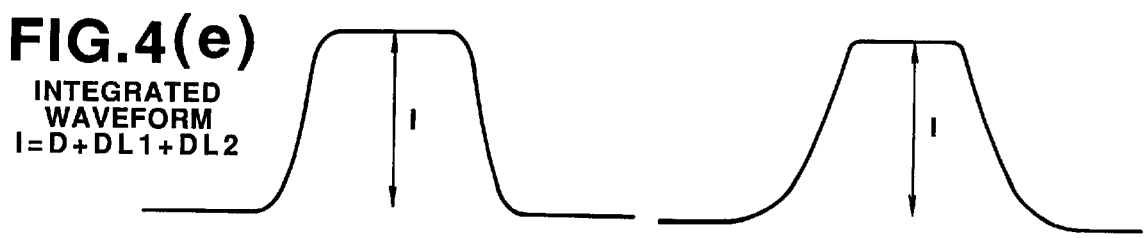
FIG. 4(f) $ES = D/I$
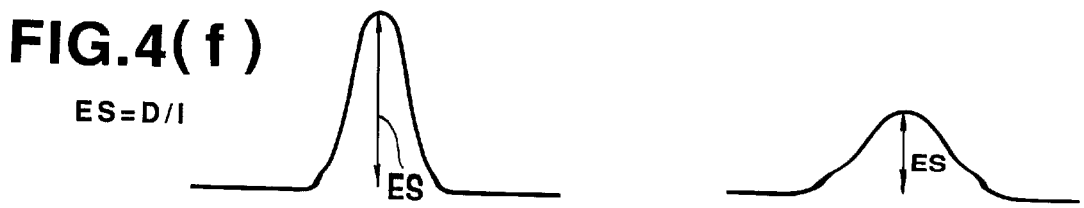

IMAGE PICKUP APPARATUS HAVING SHARPNESS CONTROL

This application is a continuation of application Ser. No. 08/481,827 filed Jun. 7, 1995, now abandoned, which is a continuation of abandoned application Ser. No. 08/073,499 filed Jun. 9, 1993 now abandoned.

BACKGROUND OF THE INVENTION

1. Field of the Invention

This invention relates to an image pickup apparatus having an autofocusing function, and more particularly, to an autofocusing (hereinafter termed "AF") function of an electronic still-picture camera.

2. Description of the Prior Art

FIG. 1 is a diagram showing the configuration of an electronic still-picture camera having an autofocusing function which detects the amount of defocus of an image from an output value from a solid-state image pickup device for photographing an object, and automatically performs a focus operation based on the detected value. In FIG. 1, reference numeral 1 represents a lens unit including a focusing lens. Lens driving motor 2 adjusts the position of lens unit 1. Reference numeral 3 represents a diaphragm. Diaphragm driving circuit 4 adjusts diaphragm 3. Solid-state image pickup device 5 converts an image of an object (optical image) focused by lens unit 1 into an electric signal. Solid-state image pickup device driving circuit 6 drives solid-state image pickup device 5. A/D conversion circuit 7 performs A/D (analog-to-digital) conversion of the output of solid-state image pickup device 5. Memory (frame memory) 8 stores the output of A/D conversion circuit 7 as still-picture image data. ES filter 9 calculates an ES value (to be described later) representing the amount of defocus based on an image signal read from memory 8. System control circuit 10 includes a CPU (central processing unit), a programable ROM (read-only memory), a RAM (random access memory) and the like, and controls the entire system.

Image-signal processing circuit 11 performs processing, such as γ-conversion, band limitation and the like, on the output of memory 8. D/A conversion circuit 12 performs D/A (digital-to-analog) conversion of the output of image-signal processing circuit 11. FM modulation circuit 13 performs FM modulation of the output of D/A conversion circuit 12. Recording amplifier 14 performs current amplification of the output of FM modulation circuit 13. Recording head 15 is connected to recording amplifier 14. Reference numeral 16 represents a magnetic sheet (floppy disk), serving as a recording medium. Motor 17 rotates magnetic sheet 16. Motor servo circuit 18 stabilizes the rotation of motor 17. Photometric device 19 measures the brightness of the object. By depressing shutter-release switch 20, a series of photographing operations are started.

FIG. 2 is a diagram illustrating an interline-transfer-type solid-state image pickup device which has been frequently used as the above-described solid-state image pickup device 5. In FIG. 2, reference numeral 501 represents the entire interline-transfer-type solid-state image pickup device. Each photodiode 502 converts light into electric charges and stores them. Each vertical CCD (charge-coupled device) 503 transfers electric charges generated by photodiodes 502 in the vertical direction. There are also shown transfer electrodes V1–V4 for vertical CCD's 503. Electrode V1 also functions as a transfer gate to transfer electric charges in odd-column photodiodes 502, and electrode V3 also functions as a transfer gate to transfer electric charges in even-column photodiodes 502. Vertical CCD's are driven, for example, with four-phase transfer pulses. Horizontal CCD 504 transfers electric charges transferred from vertical CCD's 503 in the horizontal direction. Transfer electrodes H1 and H2 for horizontal CCD 504 are driven, for example, two-phase transfer pulses. Output amplifier 505 converts electric charges into a voltage and outputs the voltage. Top drain 506 sweeps away unnecessary electric charges by transferring them in the reverse direction. Bottom drain 507 sweeps away unnecessary electric charges by transferring them in the forward direction.

FIG. 3 illustrates an operational sequence of the electronic still-picture camera having an autofocusing function shown in FIG. 1. When shutter-release button 20 has been depressed (turned on or closed) at time T0, a series of photographing operations are started. System control circuit 10 calculates the optimum stop value Av and the optimum shutter speed Tv for a photographing operation in accordance with the output of photometric device 19. Next, system control circuit 10 sets diaphragm 3 to an open state between times T1 and T2, and makes solid-state image pickup device 5 perform a series of operations n times, i.e., sweeping-away of unnecessary electric charges, exposure, and reading of signal electric charges, and moves lens unit 1 in n steps or continuously from an infinite position to the nearest position through a focus position using lens driving motor 2. That is, n times of reading operations of signal electric charges from solid-state image pickup device 5 are performed, and the amount of defocus is calculated and lens unit 1 is moved based on a signal read at each reading operation. Thus, the lens position having the minimum amount of defocus, that is, the optimum focus position or lens position P in an in-focus state is found. The exposure time at this AF operation is set so that the amount of exposure during the AF operation equals the amount of exposure obtained with the above-described optimum stop value Av and the optimum shutter speed Tv. Thereafter, system control circuit 10 sets the stop value of diaphragm 3 to the above-described optimum stop value using diaphragm driving circuit 4, and moves lens unit 1 from the nearest position to lens position P in an in-focus state using lens driving motor 2 between times T3 and T4. Then, at time T4, system control circuit 10 performs a clearing operation for solid-state image pickup device 5 using solid-state image pickup device driving circuit 6, wherein unnecessary electric charges are swept away into top drain 506 by transmitting them in the reverse direction. Then, photographic exposure is performed during from T4 to time T5. Thereafter, system control circuit 10 performs reading of signal electric charges from time T5, and records the processed signal on magnetic sheet 16.

FIGS. 4(a) through 4(f) are diagrams illustrating the ES method, which serves as a method for detecting the above-described amount of defocus. Since the ES method is a known technique disclosed in U.S. Pat. No. 4,804,831, only a brief description thereof will be provided. FIG. 4(a) illustrates image signals. The edge of the signal is steep in an in-focus state, and is less steep in an out-of-focus state. FIG. 4(b) illustrates the differentiated waveforms D of the respective image signals. FIGS. 4(c) and 4(d) illustrate delay signals DL1 and DL2 of the differentiated waveforms, respectively. FIG. 4(e) illustrates the integrated waveforms I of the image signals, representing the contrast of the edge portions of the respective image signals. As shown in FIG. 4(f), the ES value is obtained by dividing the data of the differentiated waveform D by the data of the integrated waveform I, and represents the sharpness of the edge of the signal.

FIG. 5 is a diagram illustrating an example of the configuration of ES filter 9 shown in FIG. 1. In FIG. 5, there are shown differentiating circuit 901, absolute-value circuit 902, delay circuit 903, integrating circuit 904, division circuit 905 and peak-holding circuit 906. Using this ES filter 9, the peak value of the ES value within image information for one picture frame is represented as the ES value of the one picture frame.

FIGS. 6(a) and 6(b) illustrate the relationship between the lens position and changes in the ES value when an AF operation is performed for the purpose of obtaining the focus position. The lens of lens unit 1 is continuously fed from the minimum position to the maximum position by lens driving motor 2. At that time, image information stored in solid-state image pickup device 5 is read for every vertical scanning period (abbreviated "1V"), each ES value is obtained from the read image information for each 1V, and the lens position having the maximum ES value is made to be the focus position. A curve having a peak at the focus position depicted when the abscissa represents the amount of lens feed or time and the ordinate represents a focus signal (the ES value in the present embodiment) is termed a mountaineering curve. Since the mountaineering curve in the ES method is steep, accuracy in focus detection is high. In the foregoing description, an AF operation is performed using the entire information within each picture frame of input image information. Usually, however, a part of a picture frame is assigned as a range frame, and an AF operation is performed using only a signal within the range frame, since promptness is required for an AF operation.

In the above-described conventional approach, however, the amount of exposure during an AF operation is set so as to be optimum during a photographing operation from time T4 to time T5. Such a value is not necessarily the optimum amount of exposure for the AF operation. In addition, when a high-brightness portion, such as a light source or the like, is present within the range frame, focus information as if the lens were in an in-focus state is obtained even in an out-of-focus state. As a result, an exact AF operation cannot be performed.

SUMMARY OF THE INVENTION

The present invention has been made in consideration of the above-described problems.

It is an object of the present invention to provide an improved and excellent image pickup apparatus.

It is another object of the present invention to provide an image pickup apparatus which can obtain an optimum amount of exposure for an AF operation.

It is still another object of the present invention to provide an image pickup apparatus having an AF function which can obtain secure and exact focus information by providing an image region (range frame) in which a high-brightness portion is absent.

According to one aspect, the present invention, which achieves these objectives, relates to an electronic still-picture camera having an AF function which determines a focus state of an object using an image signal obtained from a signal output of an image pickup device and detects the lens position in an in-focus state, comprising image-region setting means for selectively extracting an image region for detecting the lens position in an in-focus state, optimum-exposure-amount calculation means for calculating an optimum amount of exposure for the image region using an image signal within the image region set by the image-region setting means, and focus detection means for calculating the lens position in an in-focus state using an image signal within the image region exposed with the optimum amount of exposure calculated by the optimum-exposure-amount calculation means.

According to another aspect, the electronic still-picture camera further comprises high-brightness-portion detection means for detecting a high-brightness portion from the image signal of the image region exposed with the optimum amount of exposure calculated by the optimum-exposure-amount calculation means, and control means for controlling the camera so that the image-region setting means changes the image region when the high-brightness-portion detection means has detected a high-brightness portion, and the focus detection means calculates the lens position in an in-focus state with the optimum amount of exposure when the high-brightness-portion detection means has not detected a high-brightness portion.

According to yet another aspect of the present invention, an image pickup apparatus comprises image pickup means for converting an optical image into an electric signal, the image pickup means comprising a photosensing surface, control means for controlling the image pickup apparatus using a signal from a selected region, which is a portion of the photosensing surface of the image pickup means, detection means for detecting an abnormality of the signal from within the selected region of the photosensing surface, and region selecting means for changing the selected region of the photosensing surface when an abnormality has been detected in the presently selected region by the detection means.

According to still another aspect of the present invention, an image pickup apparatus comprises image pickup means for converting an optical image into an electric signal, the image pickup means comprising a photosensing surface, control means for controlling the image pickup apparatus using a signal from a region, which is a portion of the photosensing surface of the image pickup means, first adjustment means for adjusting the level of the signal from the region of the photosensing surface, and second adjustment means, which is different from the first adjustment means, for controlling the entire amount of exposure of the image pickup means.

As described above, in the present invention, the process of determining a range frame and the amount of exposure during an AF operation is performed, wherein a range frame, in which a high-brightness portion is absent, is determined, and the amount of exposure, which is optimum for an image signal within the range frame, is determined as preprocessing, and an AF operation using the ES method or the like is performed with the determined range frame and amount of exposure. Hence, secure and exact focus information can be obtained.

The foregoing and other objects, advantages and features of the present invention will become more apparent from the following description of the preferred embodiment taken in conjunction with the accompanying drawings.

BRIEF DESCRIPTION OF THE DRAWINGS

FIGS. 4(a) through 4(f) are diagrams of waveforms illustrating the ES method;

DESCRIPTION OF THE PREFERRED EMBODIMENT

A preferred embodiment of the present invention will now be described in detail with reference to the drawings.

Figure 1:
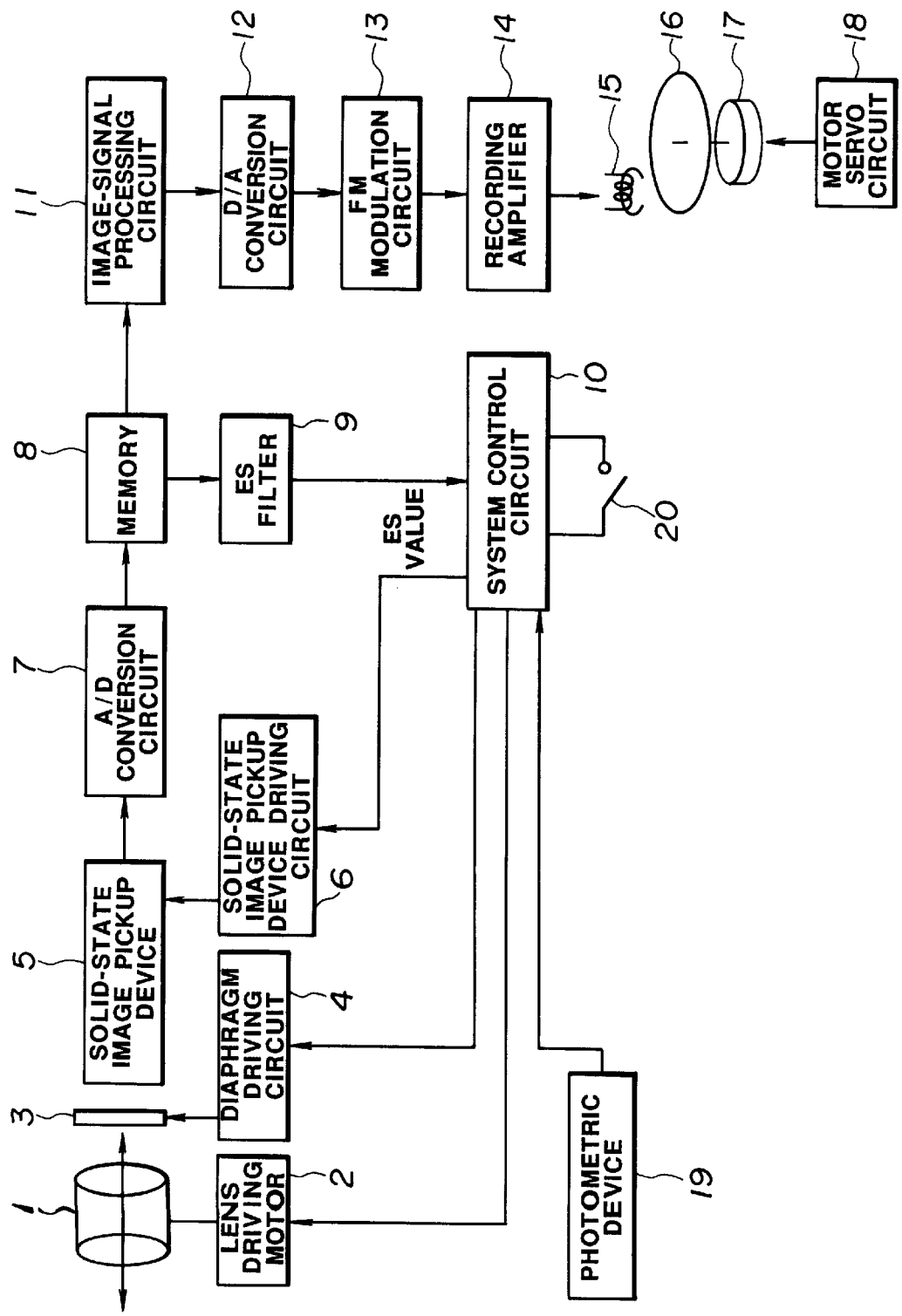
FIG. 1 is a block diagram illustrating the configuration of circuitry of an electronic still-picture camera having an AF function.
Figure 2:
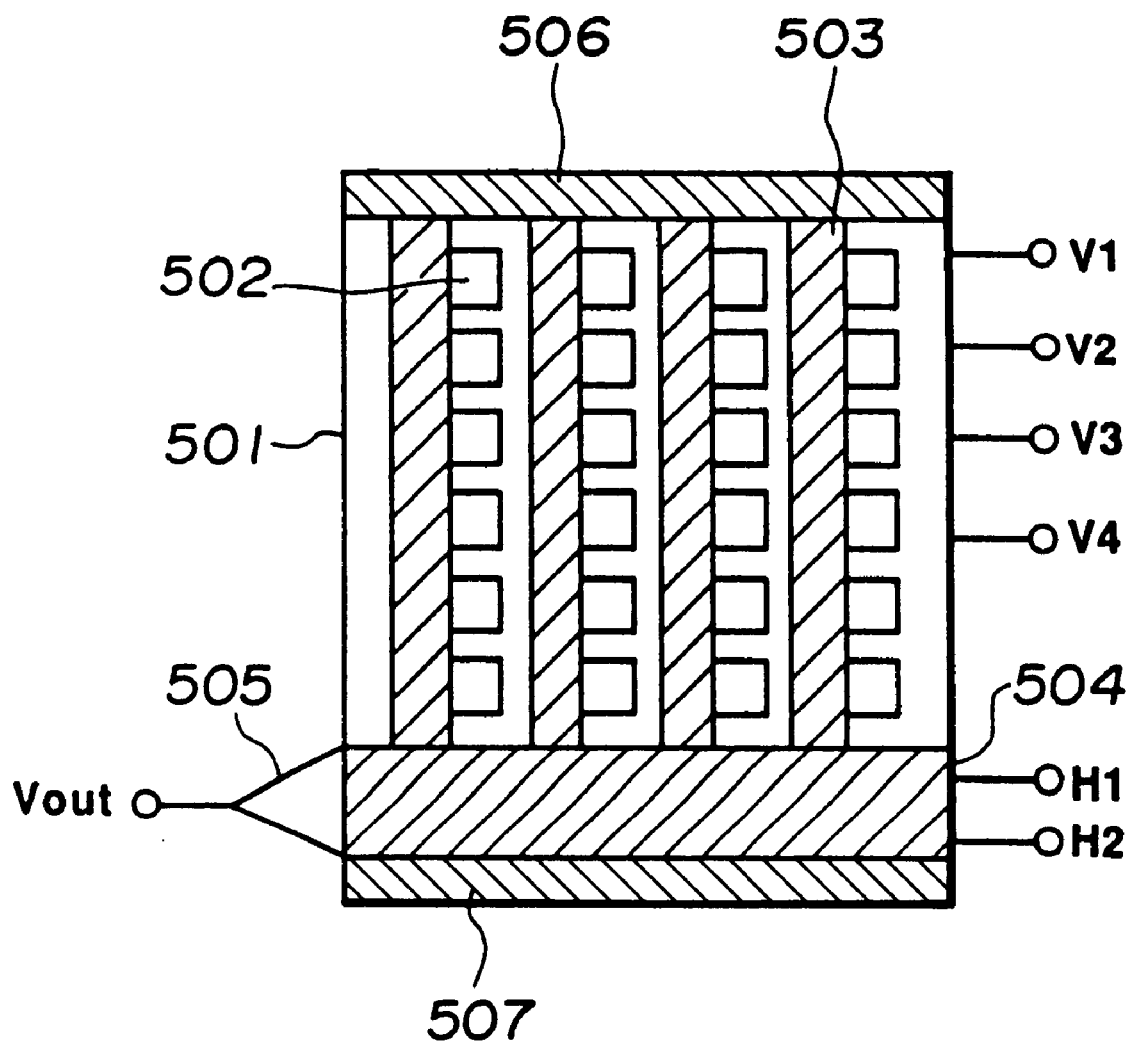
FIG. 2 is a plan view showing the configuration of an interline-transfer-type solid-state image pickup device.
Figure 3:
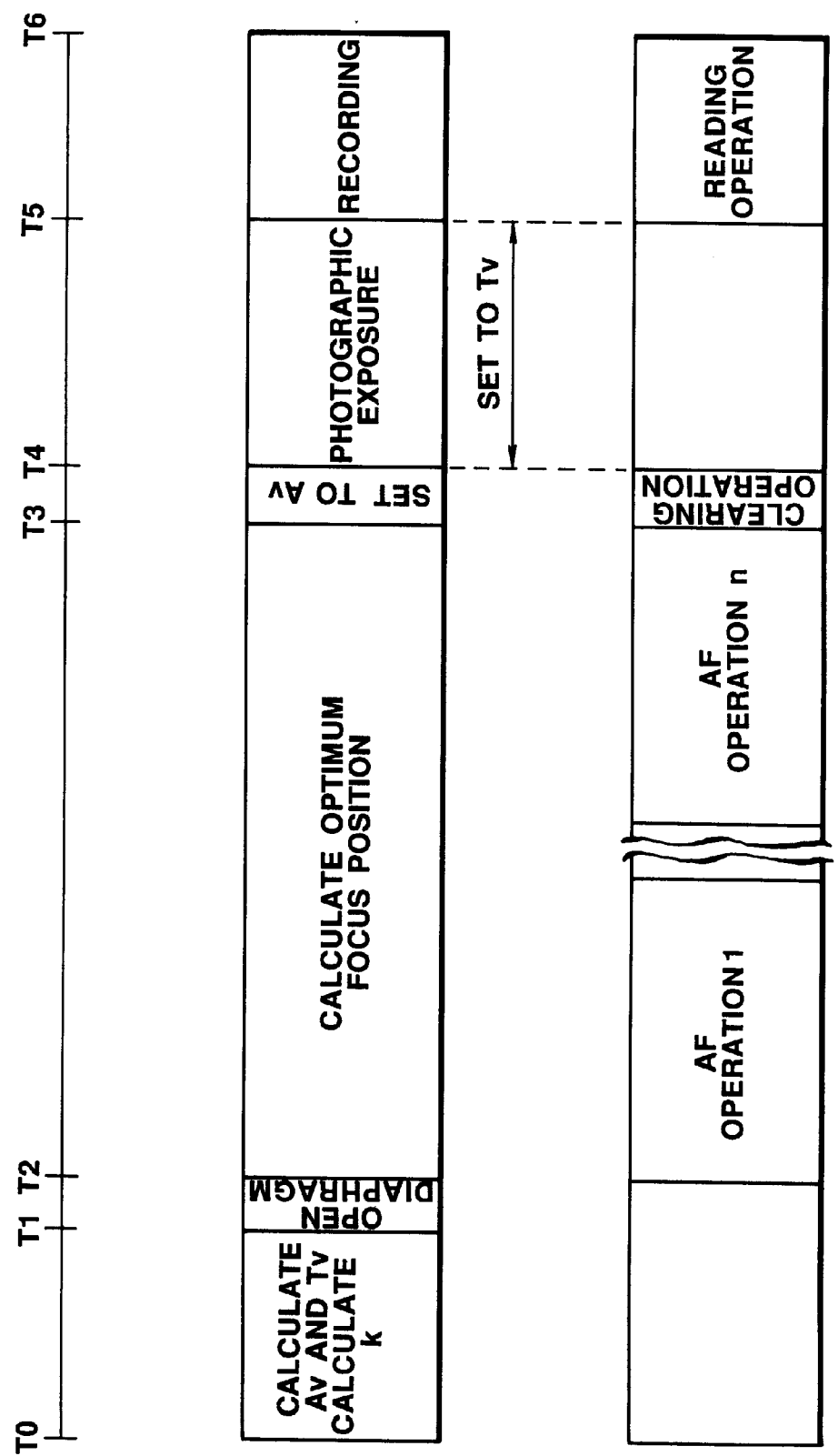
FIG. 3 is a timing chart showing an example of the operational sequence of the electronic still-picture camera shown in FIG. 1.
Figure 5:
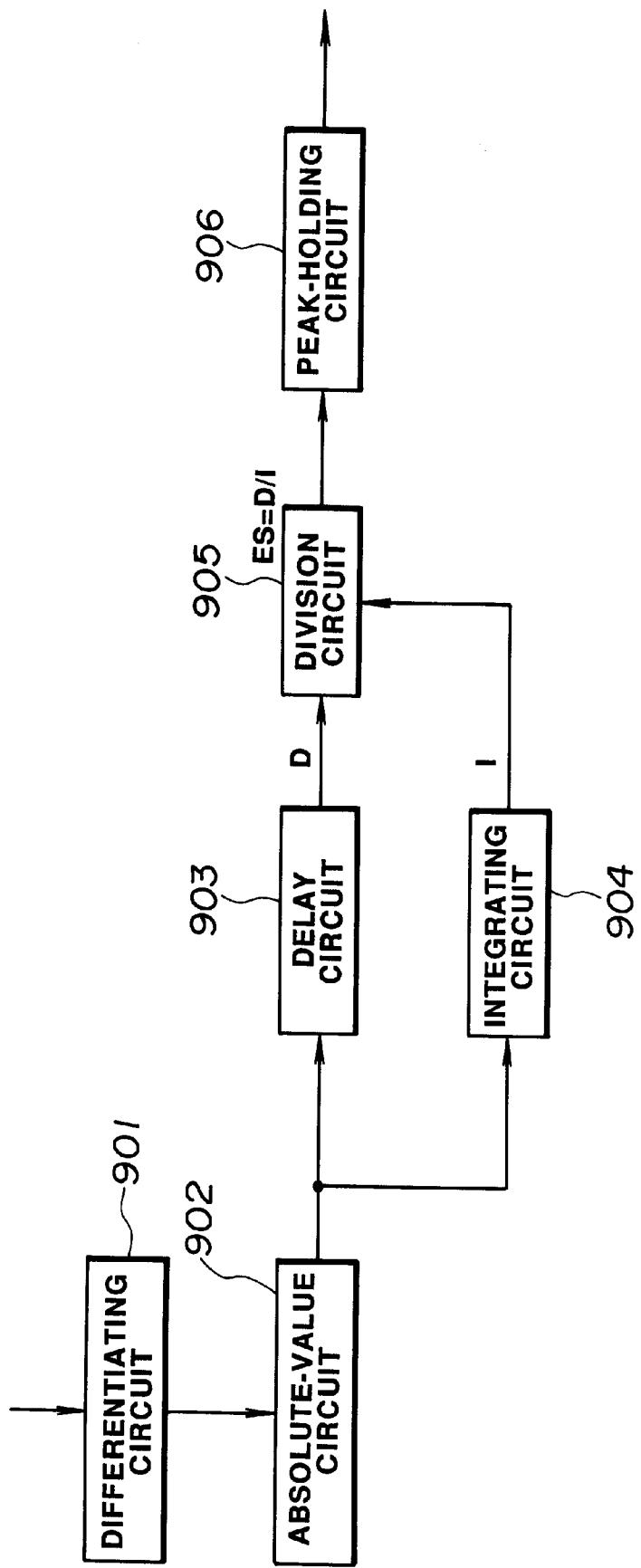
FIG. 5 is a block diagram showing an example of the configuration of the ES filter shown in FIG. 1.
Figures 6A, 6B:
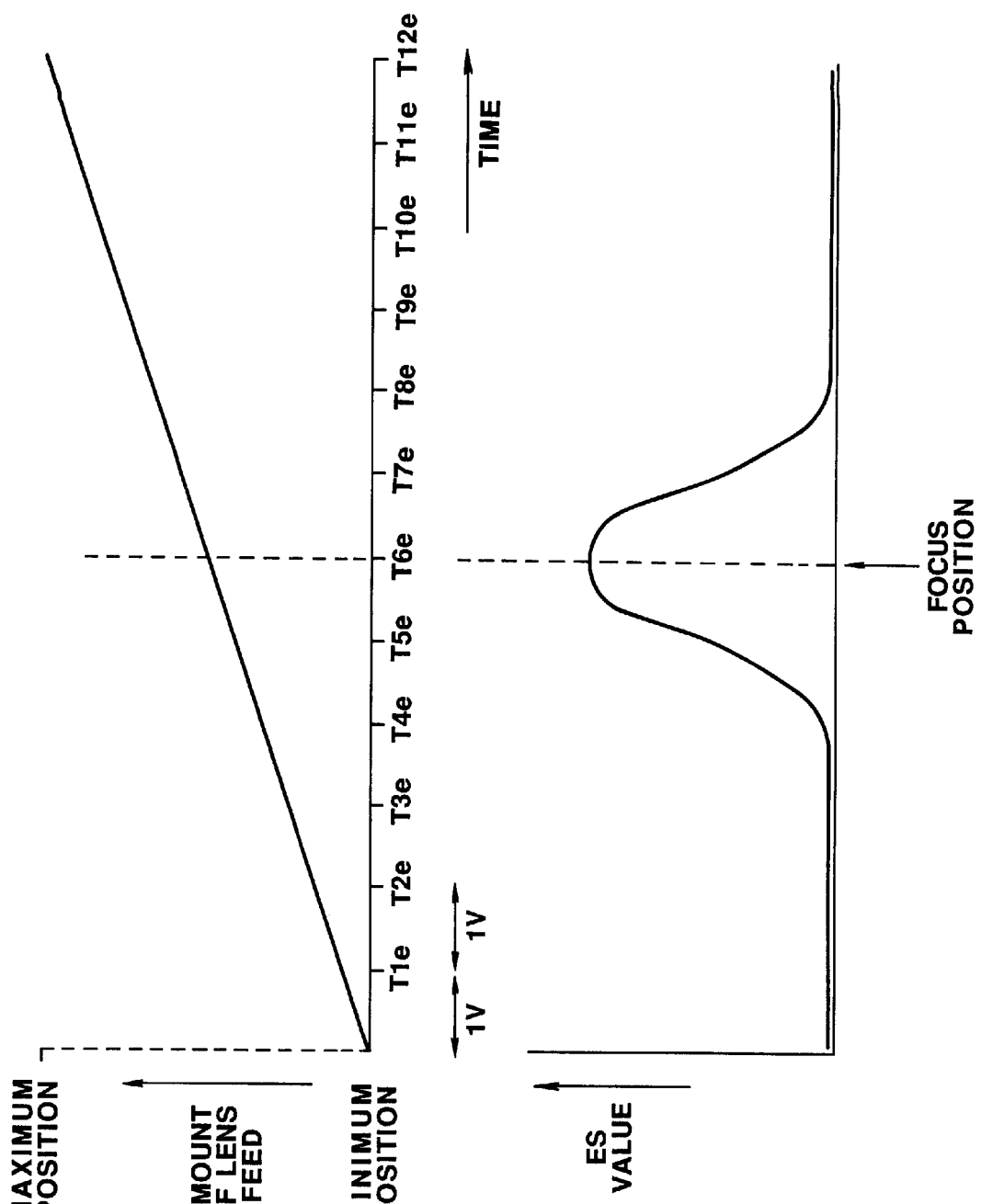
FIG. 6(a) is a diagram showing the relationship between time and the lens position when an AF operation is performed.
FIG. 6(b) is a graph illustrating changes in the ES value with time or the lens position.
Figure 7:
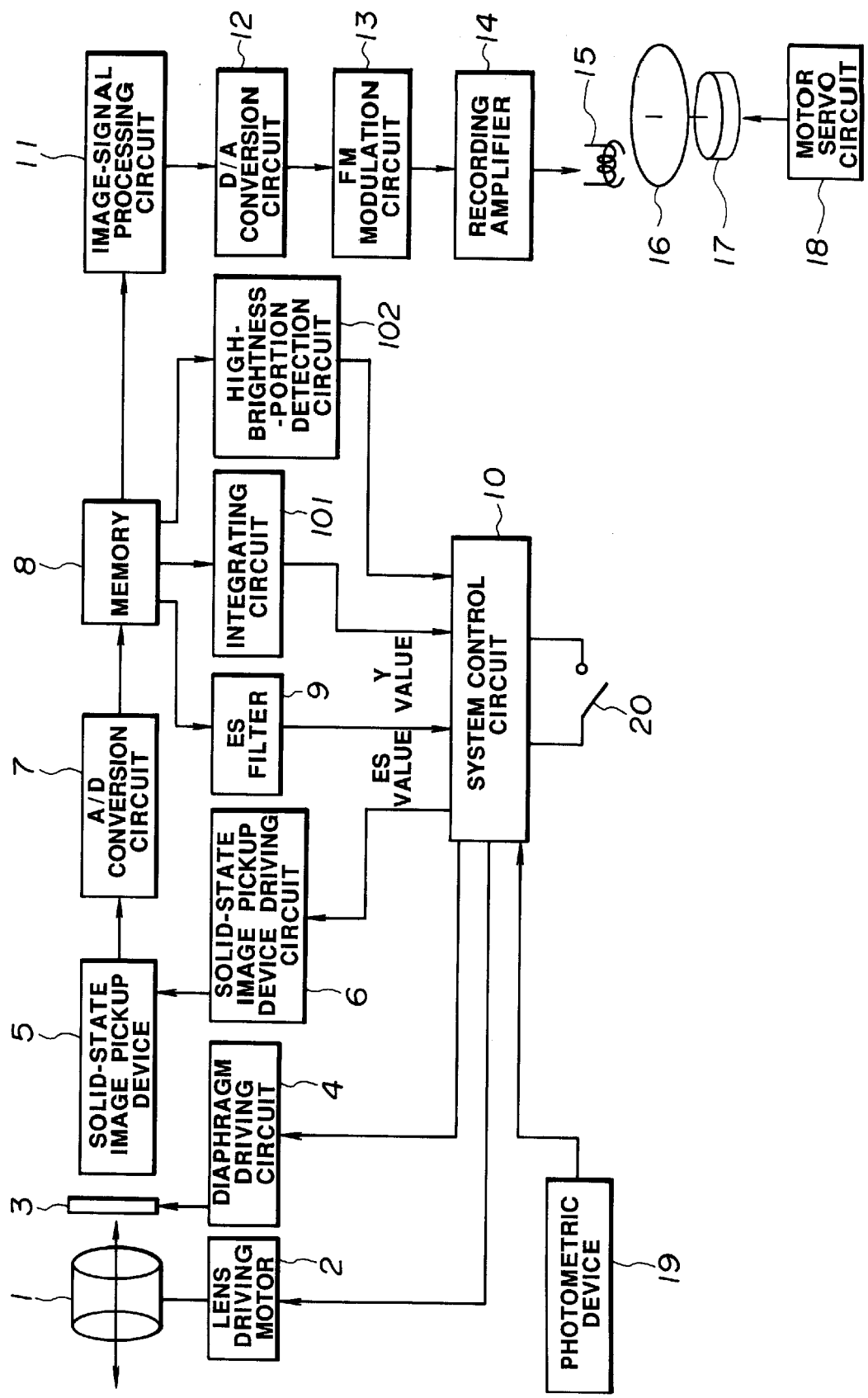
FIG. 7 is a block diagram showing the configuration of circuitry of an electronic still-picture camera having an AF function according to a preferred embodiment of the present invention.

FIG. 7 illustrates the configuration of circuitry of an electronic still-picture camera having an AF function in the preferred embodiment. In FIG. 7, the same components as those in FIG. 1 are indicated by the same reference numerals, and a description thereof will be omitted. In FIG. 7, integrating circuit 101 is connected to the output side of memory 8, and is used for calculating the average value of brightness components of an image within a range frame. The output of integrating circuit 101 is hereinafter termed a "Y value". High-brightness-portion detection circuit 102 is connected to the output side of memory 8, and is used for detecting a high-brightness portion within the range frame. The outputs of these circuits 101 and 102 are input to system control circuit 10.

Figure 8:
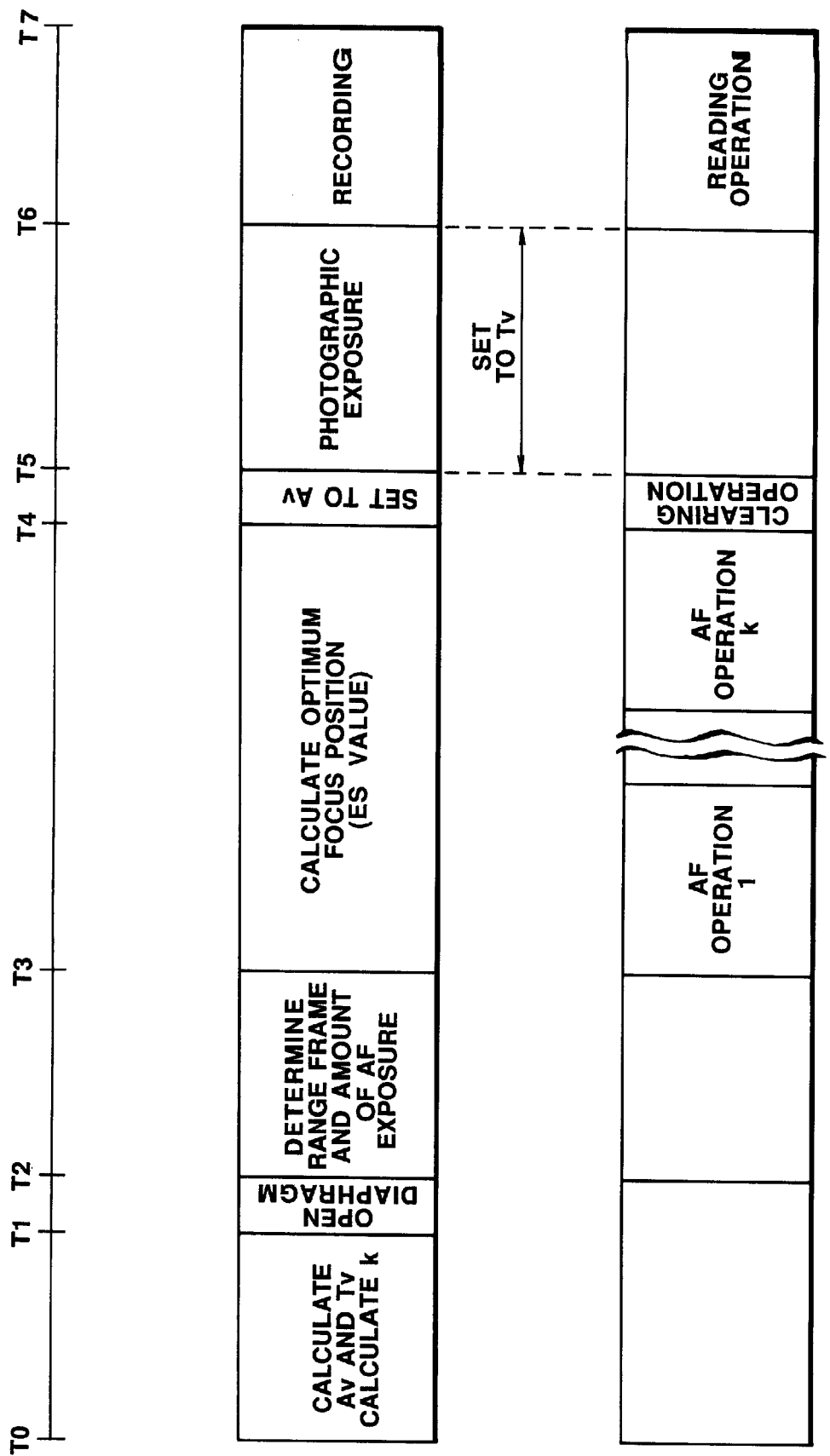
FIG. 8 is a timing chart showing the operational sequence of the preferred embodiment.
Figure 9:
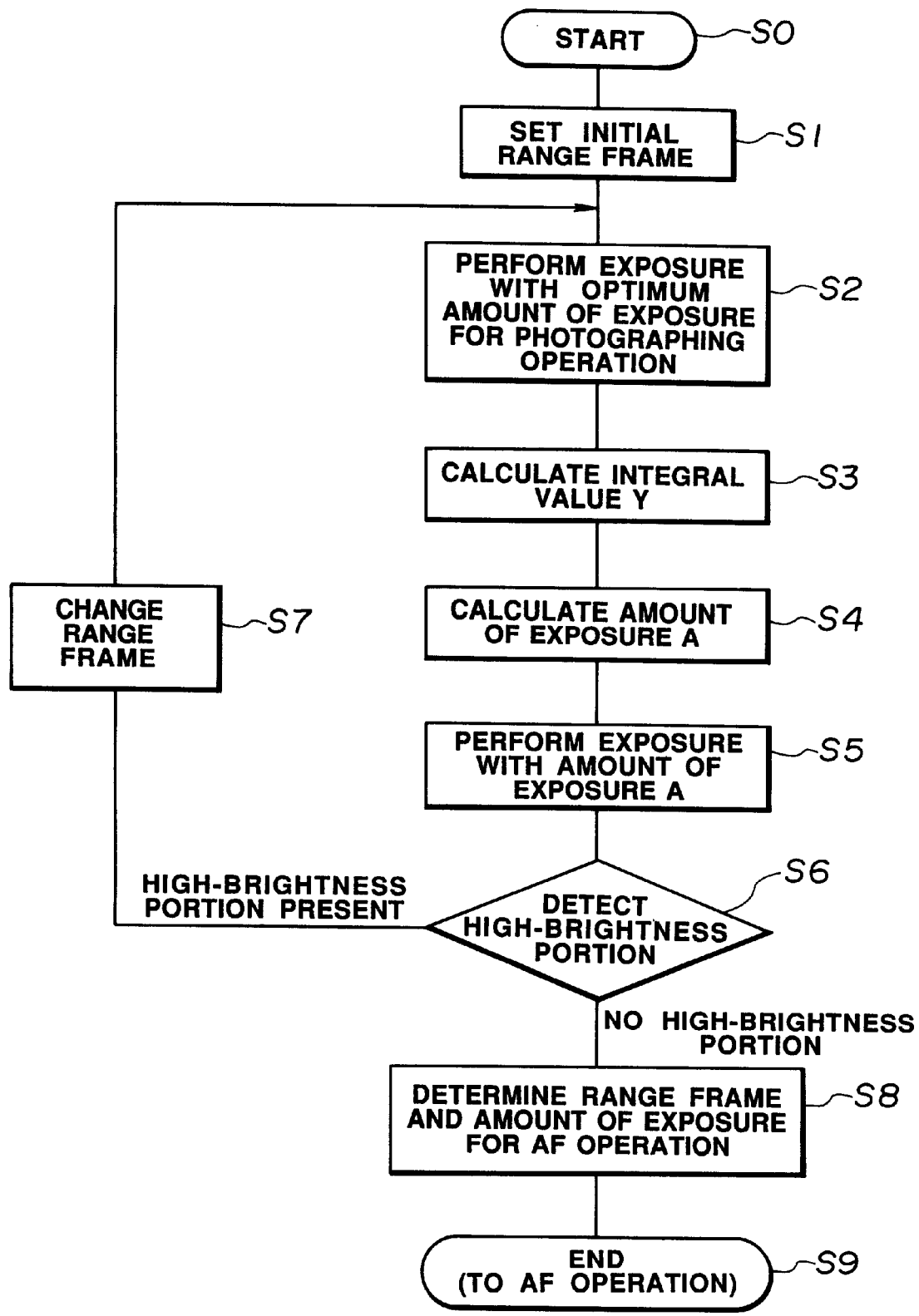
FIG. 9 is a flowchart showing the procedure of processing of determining a range frame and the amount of exposure during an AF operation.

FIG. 8 illustrates the operational sequence of the electronic still-picture camera shown in FIG. 7. FIG. 9 illustrates the procedure of the process of determining the range frame and the amount of exposure during an AF operation in the present embodiment.

A description will now be provided of the focus operation of the present embodiment with reference to FIGS. 7, 8 and 9. When shutter-release switch 20 has been depressed (turned on) at time T0 in FIG. 8, a series of photographing sequence is started. The optimum stop value Av and the optimum shutter speed Tv are calculated based on the output of photometric device 19. Diaphragm 3 is set to an open state during time T1 and time T2, and lens 1 is moved to a focus position near the midpoint between an infinite position and the nearest position (the above-described processing corresponds to step S0).

The process of determining the range frame and the amount of exposure during an AF operation is performed after time T2. First, at time T2, a range frame (initial range frame) having the minimum area for which the distance can be measured is set (step S1). The initial range frame is selected, for example, at position 1 shown in FIG. 10.

Next, exposure is performed with the optimum amount of exposure for a photographing operation (step S2), and the Y value obtained by integrating an image signal within the range frame obtained by this exposure is calculated by integrating circuit 101 (step S3). The optimum amount of exposure A for an object within the range frame is calculated from the Y value (step S4). Although in the present embodiment, the integrated value is used for calculating the optimum amount of exposure within the range frame, a value obtained by adding elements of the image signal with appropriately weighting the respective elements may be used. Alternatively, a photometric operation may be performed by guiding light from the portion of the object corresponding to the range frame to a photometric device or the like other than the image pickup device.

Next, exposure is performed with the calculated amount of exposure A (step S5). High-brightness-portion detection circuit 102 detects the presence of a high-brightness portion using the obtained image signal (step S6). If a high-brightness portion is absent, the current range frame is used, and an AF operation is performed by controlling the storage time of the image pickup device so that exposure with the amount of exposure A is effected (steps S8 and S9).

Figure 10:
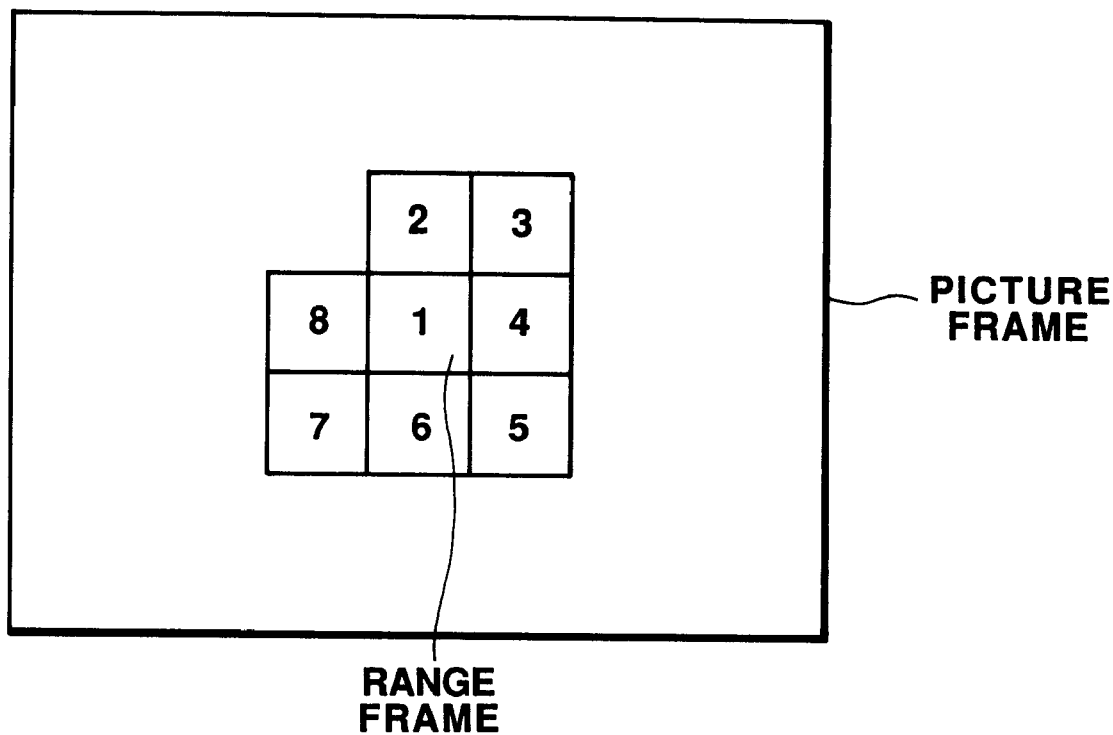
FIG. 10 is a plan view illustrating an example of movement of a range frame in the preferred embodiment.

If a high-brightness portion is present, the range frame is moved, for example, to portion 2 in FIG. 10 (step S7). Then, the process returns to step S2, and the above-described processing, such as the calculation of the Y value, the detection of a high-brightness portion, and the like, is performed (steps S2–S5). The same process is performed while moving the range frame around the initially set frame until a high-brightness portion is absent (step S7). When a high-brightness portion is absent, the range frame and the optimum amount of exposure during an AF operation are determined (step S8). In this processing, if the range frame is displayed within a viewfinder (not shown) of the camera, a more exact AF operation can be performed for the object to be focused.

At time T3, lens unit 1 is moved in k steps or continuously from the nearest position to an infinite position, a series of operations, such as the sweeping-away of unnecessary electric charges, exposure, reading of signal electric charges and the like, are performed for the image pickup device, and the amount of defocus is sequentially calculated from the output of solid-state image pickup device 5. Using the result of the calculation of the amount of defocus, the position having the miminum amount of defocus, that is, lens position P in an in-focus state is calculated.

Subsequently, between time T4 and time T5, the stop value of diaphragm 3 is set to the optimum stop value Av obtained in step S0, and lens unit 1 is moved and set to lens position P in an in-focus state.

At time T5, a clearing operation is performed in which unnecessary electric charges within solid-state image pickup device 6 are swept away into top drain 506 by inversely transmitting the charges. Thereafter, a photographing operation is performed from time T5 to time T6. From time T6, a reading of signal electric charges from solid-state image pickup device 5 is performed. The read signal is processed, and the processed signal is recorded on magnetic sheet 16.

In the present embodiment, when moving lens unit 1 to lens position P in an in-focus state, lens unit 1 is directly moved from the lens position when an AF operation has been completed. However, after the completion of an AF operation, lens unit 1 may first be moved to the position when the AF operation has been started, and thereafter may be moved to the target position P in the same direction as in the AF operation. Filter 9 for detecting the amount of defocus is not limited to an ES filter, but a filter having predetermined characteristics, such as a high-pass filter, a band-pass filter or the like, may also be used.

Although in the present embodiment, the focus detection means comprises a digital filter, focus detection may, of course, be performed by an analog method.

As described above, according to the preferred embodiment of the present invention, the process of determining a range frame and/or the amount of exposure for the range frame, wherein a range frame which does not include a high-brightness portion is searched for, and/or the optimum amount of exposure for an image signal within the range frame is determined as preprocessing, is performed, and an AF operation is performed using a signal from the range frame. Hence, secure and exact focus information can be obtained. Although in the above-described embodiment, a description has been provided of a case in which the present invention is applied to an electronic still-picture camera, the present invention may, of course, be applied to a movie video camera or a camcorder.

That is, in a movie camera or the like, when a high-brightness portion is present within a range frame, an error in distance measurement can be reduced by shifting or changing the range frame.

In addition, in a movie camera or the like, an error in distance measurement can also be reduced by optimizing exposure conditions only for the portion of a range frame. For that purpose, the storage time or the like of the portion of the image pickup device corresponding the range frame may be controlled independently from the storage time of other portions. If a signal within a range frame has a too large value, the size of the frame may, for example, be reduced.

The individual components shown in outline or designated by blocks in the drawings are all well-known in the image pickup apparatus arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus, comprising:

image pickup means for converting an optical image into a frame of an electric signal;

region selecting means for selecting a region within said frame;

detection means for detecting an abnormality in brightness based on the level of the signal from within the selected region within said frame;

changing means for changing the selected region from the currently selected region to a newly selected region when the abnormality on brightness has been detected in the currently selected region by said detection means;

exposures control means for controlling an amount of exposure on said image pickup means on the basis of the optical image that is incident upon said image pickup using a signal from the newly selected region when the currently selected region has been changed by said changing means, said newly selected region including a portion of the currently selected region; and sharpness control means for controlling the sharpness of the optical image that is incident upon said image pickup means using a signal from the newly selected region, with controlling the entire amount of exposure by said exposure control means.

2. An image pickup apparatus according to claim 1, wherein storage time of said image pickup means is controlled.

3. An image pickup apparatus according to claim 1, wherein said exposure control means controls an amount of light incident upon said image pickup means.

4. An image pickup apparatus according to claim 1, wherein said changing means changes the position of the currently selected region to another region within said frame.

5. An image pickup apparatus according to claim 1, wherein said changing means changes the size of the region within said frame designated as the currently selected region.

6. An image pickup apparutus, comprising:

image pickup means for converting an optical image into a frame of an electrical signal;

region selecting means for selecting a region within said frame;

first adjustment means for discriminating the level of the signal from the selected region within said frame, and for changing the selected region from a currently selected region to a newly selected region when an abnormality in brightness has been discriminated in the currently selected region;

second adjustment means, which is different from said first adjustment means, for controlling the entire amount of exposure of said image pickup means based on the newly selected region when the currently selected region has been changed by said first adjusting means; and sharpness control means for controlling the sharpness of the optical image that is incident upon said image pickup means using a signal from the newly selected region, with controlling the entire amount of exposure by said second adjusting means, said newly selected region including a portion of the currently selected region.

7. An image pickup apparatus according to claim 6, wherein said first adjustment means changes the position of the currently selected region to another region within said frame.

8. An image pickup apparatus according to claim 6, wherein said first adjustment means changes the size of the region within said frame designated as the currently selected region.

9. An image pickup apparatus according to claim 6, wherein said first adjustment means controls an amount of exposure within the newly selected region.

10. An image pickup apparatus according to claim 9, wherein said first adjustment means controls storage time of the signal within the newly selected region.

11. An image pickup apparatus according to claim 6, wherein said second adjustment means comprises at least one of a diaphragm and a shutter.

* * * * *

UNITED STATES PATENT AND TRADEMARK OFFICE
CERTIFICATE OF CORRECTION

PATENT NO.   : 5,978,027
DATED        : November 2, 1999
INVENTOR(S)  : NOBUHIRO TAKEDA It is certified that error appears in the above-identified patent and that said Letters Patent is hereby corrected as shown below:

<u>COLUMN 2</u>

Line 47, "during" should be deleted.

<u>COLUMN 5</u>

Line 50, "sequence" should read --sequences--.

<u>COLUMN 7</u>

Line 26, "corresponding" should read --corresponding to--;
   Line 62, "exposures" should read --exposure--.

Signed and Sealed this

Twenty-second Day of August, 2000

Attest:

Q. TODD DICKINSON

Attesting Officer

Director of Patents and Trademarks